US012326715B2

(12) United States Patent
Ikeda et al.

(10) Patent No.: US 12,326,715 B2
(45) Date of Patent: Jun. 10, 2025

(54) APPARATUS FOR TAKING OUT MOLDED PRODUCT

(71) Applicant: Yushin Precision Equipment Co., Ltd., Kyoto (JP)

(72) Inventors: Koji Ikeda, Kyoto (JP); Hiroki Kida, Kyoto (JP); Fumitake Watanabe, Kyoto (JP)

(73) Assignee: YUSHIN PRECISION EQUIPMENT CO., LTD., Kyoto (JP)

( * ) Notice: Subject to any disclaimer, the term of this patent is extended or adjusted under 35 U.S.C. 154(b) by 423 days.

(21) Appl. No.: 17/948,559

(22) Filed: Sep. 20, 2022

(65) Prior Publication Data

US 2023/0100867 A1   Mar. 30, 2023

(30) Foreign Application Priority Data

Sep. 22, 2021  (JP) ................................. 2021-154039

(51) Int. Cl.
   *G05B 19/4155*   (2006.01)

(52) U.S. Cl.
   CPC ..... *G05B 19/4155* (2013.01); *G05B 2219/45244* (2013.01)

(58) Field of Classification Search
   CPC .. B29C 2045/7633; B29C 2945/76006; B29C 2945/76317; B29C 2945/76421;
   (Continued)

(56) References Cited

U.S. PATENT DOCUMENTS

| 5,629,207 A * | 5/1997 | Seto ................. G01N 35/00029 436/55 |
| 2006/0053624 A1* | 3/2006 | Maeda ............... H05K 13/0409 29/832 |

(Continued)

FOREIGN PATENT DOCUMENTS

| EP | 1 542 524 A1 | 6/2005 |
| JP | 64-086088 | 3/1989 |

(Continued)

OTHER PUBLICATIONS

Extended European Search Report published in the counterpart EP application No. 22 19 5338 on Mar. 29, 2023; English text (7 pages).

*Primary Examiner* — Tameem D Siddiquee
(74) *Attorney, Agent, or Firm* — Rankin, Hill & Clark LLP

(57) ABSTRACT

Provided is an apparatus for taking out a molded product, which is capable of determining occurrence of a suction error and/or likelihood of a suction error of the molded product with high accuracy and of knowing a cause thereof. A pressure data storing section stores time-series pressure data from a pressure detector. A suction error cause determining section determines occurrence of a suction error and/or likelihood of a suction error of a molded product by a suction member on a basis of a time-series comparison result obtained by comparing the stored time-series pressure data with predetermined time-series reference data. When the suction error cause determining section determines the occurrence of the suction error and/or the likelihood of the suction error, the suction error cause determining section determines a cause of the occurring suction error and a solution therefor based on a time-series change pattern.

10 Claims, 6 Drawing Sheets

| | EVENT | CAUSE | CONFIRMATION ITEM (SOLUTION) |
|---|---|---|---|
| PATTERN 1 | ATTACHMENT HEAD IS NOT IN CONTACT WITH MOLDED PRODUCT | SUCTION PAD IS NOT IN CONTACT WITH MOLDED PRODUCT | STATE OF SUCTION PAD |
| | | EJECTION TIMING OF EJECTOR PIN IS BAD | TEACHING TIMER |
| | | EJECTION AMOUNT OF EJECTOR PIN IS NOT APPROPRIATE | STATE OF MOLDING MACHINE |
| PATTERN 2 | MOLDED PRODUCT IS DETACHED FROM ATTACHMENT HEAD (MOLDED PRODUCT IS TEMPORARILY SUCKED UP) | SUCTION PAD IS NOT IN CONTACT WITH MOLDED PRODUCT | STATE OF SUCTION PAD |
| | | EJECTION TIMING OF EJECTOR PIN IS BAD | TEACHING TIMER |
| | | | STATE OF MOLDING MACHINE |
| | | EJECTION AMOUNT OF EJECTOR PIN IS NOT APPROPRIATE | STATE OF MOLDING MACHINE |
| | | AIR SUPPLY PRESSURE HAS DECREASED | AIR SUPPLY PRESSURE |
| | | AIR LEAK OCCURS | SUCTION PAD |
| | | FILTER CLOGGING OCCURS | STATE OF PNEUMATIC CIRCUIT |
| PATTERN 3 | MOLDED PRODUCT IS SUCKED UP, BUT SUCTION PRESSURE DOES NOT RISE TO SET VALUE FOR DETECTION | AIR SUPPLY PRESSURE HAS DECREASED | AIR SUPPLY PRESSURE |
| | | AIR LEAK OCCURS | SUCTION PAD |
| | | FILTER CLOGGING OCCURS | STATE OF PNEUMATIC CIRCUIT |
| | | MOLDED PRODUCT CAN ONLY BE PARTIALLY SUCKED UP | STATE OF SUCTION PAD |
| | | | TEACHING POSITION |
| | | | TEACHING TIMER |
| PATTERN 4 | MOLDED PRODUCT IS SUCKED UP, BUT SUCTION PRESSURE RISES SLOWLY AND IS NOT IN TIME FOR DETECTION TIMING | AIR LEAK OCCURS | SUCTION PAD |
| | | FILTER CLOGGING OCCURS | STATE OF PNEUMATIC CIRCUIT |
| | | AIR SUPPLY PRESSURE HAS DECREASED | AIR SUPPLY PRESSURE |

(58) Field of Classification Search
CPC ........... B29C 2945/76936; B29C 2945/76946; B29C 45/4225; B29C 45/7626; B29C 45/768; G05B 19/4155; G05B 2219/45244

See application file for complete search history.

(56) References Cited

U.S. PATENT DOCUMENTS

| | | | | |
|---|---|---|---|---|
| 2016/0316982 | A1* | 11/2016 | Kim | A47L 9/2857 |
| 2021/0086425 | A1* | 3/2021 | Takano | B29C 45/03 |
| 2022/0016748 | A1* | 1/2022 | Sakamoto | B25B 11/005 |

FOREIGN PATENT DOCUMENTS

| | | |
|---|---|---|
| JP | 2005-50858 A | 2/2005 |
| JP | 2007-319960 | 12/2007 |

* cited by examiner

Fig. 5

| | EVENT | CAUSE | CONFIRMATION ITEM (SOLUTION) |
|---|---|---|---|
| PATTERN 1 | ATTACHMENT HEAD IS NOT IN CONTACT WITH MOLDED PRODUCT | SUCTION PAD IS NOT IN CONTACT WITH MOLDED PRODUCT | STATE OF SUCTION PAD |
| | | EJECTION TIMING OF EJECTOR PIN IS BAD | TEACHING TIMER |
| | | EJECTION AMOUNT OF EJECTOR PIN IS NOT APPROPRIATE | STATE OF MOLDING MACHINE |
| PATTERN 2 | MOLDED PRODUCT IS DETACHED FROM ATTACHMENT HEAD (MOLDED PRODUCT IS TEMPORARILY SUCKED UP) | SUCTION PAD IS NOT IN CONTACT WITH MOLDED PRODUCT | STATE OF SUCTION PAD |
| | | EJECTION TIMING OF EJECTOR PIN IS BAD | TEACHING TIMER |
| | | | STATE OF MOLDING MACHINE |
| | | EJECTION AMOUNT OF EJECTOR PIN IS NOT APPROPRIATE | STATE OF MOLDING MACHINE |
| | | AIR SUPPLY PRESSURE HAS DECREASED | AIR SUPPLY PRESSURE |
| | | AIR LEAK OCCURS | SUCTION PAD |
| | | FILTER CLOGGING OCCURS | STATE OF PNEUMATIC CIRCUIT |
| PATTERN 3 | MOLDED PRODUCT IS SUCKED UP, BUT SUCTION PRESSURE DOES NOT RISE TO SET VALUE FOR DETECTION | AIR SUPPLY PRESSURE HAS DECREASED | AIR SUPPLY PRESSURE |
| | | AIR LEAK OCCURS | SUCTION PAD |
| | | FILTER CLOGGING OCCURS | STATE OF PNEUMATIC CIRCUIT |
| | | MOLDED PRODUCT CAN ONLY BE PARTIALLY SUCKED UP | STATE OF SUCTION PAD |
| | | | TEACHING POSITION |
| | | | TEACHING TIMER |
| PATTERN 4 | MOLDED PRODUCT IS SUCKED UP, BUT SUCTION PRESSURE RISES SLOWLY AND IS NOT IN TIME FOR DETECTION TIMING | AIR LEAK OCCURS | SUCTION PAD |
| | | FILTER CLOGGING OCCURS | STATE OF PNEUMATIC CIRCUIT |
| | | AIR SUPPLY PRESSURE HAS DECREASED | AIR SUPPLY PRESSURE |

APPARATUS FOR TAKING OUT MOLDED PRODUCT

BACKGROUND OF THE INVENTION

Field of the Invention

The present invention relates to an apparatus for taking out a molded product, which has a function of determining occurrence of a suction error of the molded product by a suction member.

Description of the Related Art

JPA 2007-319960 (Patent Literature 1) discloses an apparatus for taking out a molded product, which includes a vacuum abnormality determining unit that determines whether a vacuum abnormality due to a state of a pipe or a suction member before suction occurs based on degree of vacuum detected by a vacuum pressure detector before the molded product is sucked up by the suction member.

JPA H1-86088 (Patent Literature 2) discloses a technique for distinguishing whether a component is non-defective or defective and a suction state of the component as a stage difference of a vacuum pressure in a nozzle during suction of the component by a vacuum pressure detecting section that distinguishes the vacuum pressure in a plurality of stages.

According to the invention disclosed in Patent Literature 1, likelihood of damage or clogging of the pipe is detected by comparing a state of an idle suction pressure before suction with a specified level range, and thus it is possible to detect presence or absence of a vacuum abnormality before a workpiece is sucked up by the suction member, thereby preventing occurrence of a suction error of the workpiece and dropping of the workpiece during transportation. However, according to the related-art invention, it is not possible to know occurrence of a suction error that occurs after the suction is started, and a cause thereof. Moreover, according to the invention, it is not possible to know that a suction error is likely to occur even if no suction error occurs.

As in the related-art invention disclosed in Patent Literature 2, in a case where the vacuum pressure in the nozzle during suction of the component is distinguished in the plurality of stages to determine whether the component is non-defective or defective and the suction state of the component, it may be difficult to set the stage difference of the vacuum pressure as a reference for determination since an idle suction pressure changes each time the head is changed in an apparatus such as an apparatus for taking out a molded product in which the head is frequently changed. Moreover, according to the invention disclosed in this publication, it is not possible to know a cause of an occurring suction error with high accuracy, and it is not possible to know that a suction error is likely to occur.

SUMMARY OF THE INVENTION

An object of the invention is to provide an apparatus for taking out a molded product, which is capable of knowing a cause of an occurring suction error and/or a cause of a likely suction error of the molded product with high accuracy.

In addition to the above object, another object of the invention is to provide an apparatus for taking out a molded product, which is capable of knowing a cause of an occurring suction error and/or a cause of a likely suction error, and solutions therefor.

An apparatus for taking out a molded product according to the invention includes: a vacuum suction device including a suction member operable to suck up a molded product, a vacuum generator connected to the suction member via a pipe to apply a vacuum pressure to the suction member, a pressure valve operable to control the vacuum pressure to be applied from the vacuum generator to the suction member, and a pressure detector operable to detect a pressure to be applied to the suction member; a moving mechanism operable to move the suction member from a mold of a molding machine; a controller operable to perform operation control of the vacuum generator and the pressure valve, and drive control of the moving mechanism; a pressure data storing section operable to store a change in the pressure detected by the pressure detector as time-series pressure data; and a suction error cause determining section operable to determine if a suction error of the molded product by the suction member occurs, and a cause thereof. The suction error cause determining section determines the cause of the occurring suction error and/or a cause of a likely suction error of the molded product by the suction member (that is, at least one of the cause of occurring suction error and the cause of the likely suction error of the molded product) based on a time-series comparison result obtained by comparing the time-series pressure data with predetermined time-series reference data.

The time-series pressure data include all information on suction situations in a process up to suction and a process after the suction. Even if the pressure does not rise or the pressure temporarily fluctuates for some reason during a process of the suction, these situations appear in the time-series pressure data. Therefore, according to the invention, based on the time-series comparison result obtained by comparing the time-series pressure data with the predetermined time-series reference data, even when the time-series pressure data temporarily exceeds a threshold, it is possible to prevent erroneous determination that no suction error occurs. It is also possible to detect that some cause causing the suction error during the operation process has occurred based on a time-series change pattern of the pressure data. If a feature of a change in the pressure appearing in the time-series pressure data when the suction error occurs due to a previously known cause is grasped, it is also possible to determine the cause of the suction error. If a feature of a change in the pressure appearing in the time-series pressure data appearing in a plurality of take-out strokes before occurrence of the suction error is grasped, it is also possible to determine the cause of the likely suction error. Therefore, according to the invention, it is possible to determine occurrence of the suction error and/or likelihood of the suction error of the molded product with higher accuracy than in the related art, and to know the cause of the occurring suction error and/or the cause of the likely suction error. Therefore, the invention can be used not only in detection of the occurrence of the suction error but also in predictive maintenance of the apparatus for taking out a molded product.

The time-series pressure data include an idle suction pressure in the pipe before the suction member sucks up the molded product, a suction start pressure that indicates the suction member has started sucking up the molded product, a post take-out pressure that indicates a pressure after the suction member together with the molded product has been elevated to a predetermined position after the suction member has sucked up the molded product, and a peak pressure that is a maximum pressure out of pressures in the pipe after the idle suction pressure has been detected and until the post take-out pressure is detected. These pressures are characteristic pressures, but are not all clearly included in the time-series pressure data, and may or may not appear in the time-series pressure data depending on the situation. The time-series reference data are determined on a premise that the various pressures described above are included in the pressure data.

The time-series reference data include one or more reference pressure values determined in advance by testing, and information on a plurality of time-series pressure change patterns collected in advance that are associated with causes of occurring suction errors and/or causes of likely suction errors. The suction error cause determining section may determine that no suction error occurs in conditions that the idle pressure is lower than the reference pressure value and the post take-out pressure and the peak pressure are lower than the reference pressure value; determine that the suction error occurs or the suction error is likely to occur when the conditions are not satisfied; and output information on causes of occurring suction errors on a basis of the result of comparing and the information on the plurality of time-series pressure change patterns when it determines that the suction error occurs or the suction error is likely to occur. By using the time-series comparison result, a tendency that appears in the comparison result does not change greatly even if the take-out head being used is changed, and thus it is possible to prevent erroneous determination of the cause of the occurring suction error and/or the cause of the likely suction error.

The reference pressure value is preferably changeable. In this way, fine adjustment can be performed, and thus versatility can be enhanced.

The reference pressure value may include a first reference pressure value used for determining an occurrence of the suction error and a second reference pressure value used for determining a likelihood of the suction error. In this way, determination accuracy can be further improved.

It is preferable that the pressure data storing section stores a time-series change pattern of the pressure for each take-out cycle, and the suction error cause determining section outputs a solution for a cause based on the time-series change pattern when it is determined that a suction error occurs or a suction error is likely to occur. When the solution is output, a cause of the occurring suction error can be corrected immediately after occurrence of the suction error is determined, and a cause of the likely suction error can be corrected before the suction error occurs, so that a significant decrease in production efficiency can be prevented.

The suction error cause determining section may acquire a cause of an occurring suction error or likelihood of a suction error by inputting the time-series pressure data to a learning model which has been subjected to machine learning using, as teacher data, a plurality of time-series pressure data collected in advance when suction errors occurred or when suction errors were likely to occur, and causes of the suction errors. That is, the suction error cause determining section may be implemented using so-called artificial intelligence (AI). Further, the suction error cause determining section may acquire a cause of an occurring suction error and/or a cause of a likely suction error, and solutions therefor by inputting the time-series pressure data to a learning model which has been subjected to machine earning using, as teacher data, a plurality of time-series pressure data collected in advance when suction errors occurred, causes of occurring suction errors and/or causes of likely suction errors, and solutions therefor. In this way, when the machine learning model is used for the determination based on the pattern, it is possible to determine the cause of the suction error and the solution therefor with higher accuracy.

The cause of the suction error and the solution therefor may be displayed on a screen of a display device or may be output by voice. In this way, an operator can quickly deal with the cause.

BRIEF DESCRIPTION OF THE DRAWINGS

FIG. 5 is a table summarizing examples of events, causes, and confirmation items (solutions) in cases of the time-series change patterns in FIGS. 4B to 4E.

DESCRIPTION OF THE PREFERRED EMBODIMENTS

Figure 1:
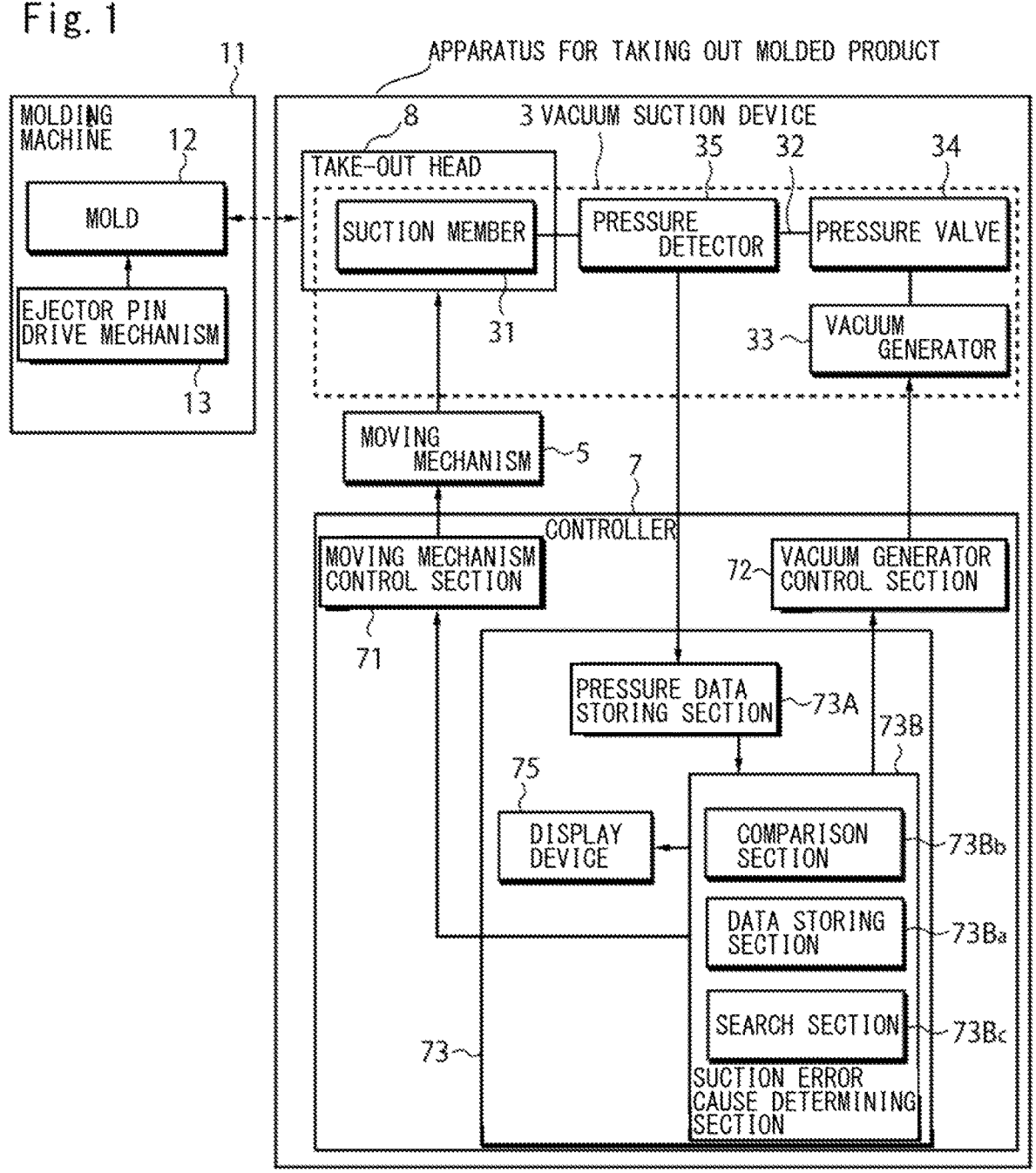
FIG. 1 is a block diagram showing, in a block form, a main part of a configuration of an apparatus for taking out a molded product according to an embodiment of the invention.

Hereinafter, an embodiment of an apparatus for taking out a molded product according to the invention will be described in detail with reference to the drawings. FIG. 1 is a block diagram showing a main part of a configuration of an apparatus 1 for taking out a molded product according to the present embodiment of the invention, which takes out the molded product from a molding machine 11. The apparatus 1 for taking out a molded product includes a vacuum suction device 3, a moving mechanism 5, and a controller 7. The configuration in FIG. 1 shows an arrangement configuration of a pressure valve 34 to be used when a vacuum pump is used as the vacuum suction device 3. When a vacuum ejector is used as a vacuum generator 33, the pressure valve 34 is disposed in front of the vacuum generator 33. Therefore, the invention is not limited to the configuration in FIG. 1. The vacuum suction device 3 includes a suction member 31 including a suction nozzle that sucks up a molded product, the vacuum generator 33 that is connected to the suction member 31 via a pipe 32 to apply a vacuum pressure to the suction member 31, the pressure valve 34 that allows or blocks communication between the vacuum generator 33 and the suction member 31, and a pressure detector 35 that detects a pressure in the pipe 32 between the pressure valve 34 and the suction member 31. The suction member 31 is attached to a take-out head 8 that is moved by the moving mechanism 5.

Figure 2:
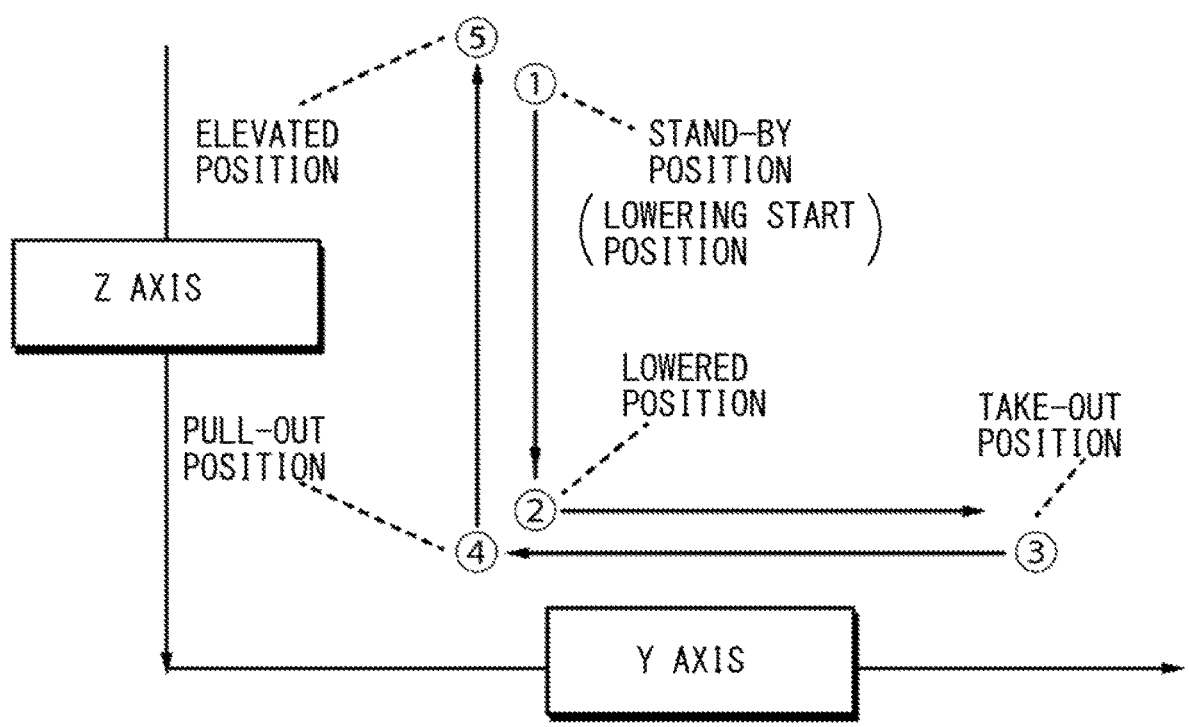
FIG. 2 is a view showing a moving path of a take-out head by a moving mechanism.

In a case where the moving mechanism 5 is a well-known three-axis moving mechanism, that is, an XYZ type moving mechanism, when performing a take-out operation of taking out a molded product as shown in FIG. 2, the moving mechanism 5 moves the take-out head 8 provided with the suction member 31 along a Z axis and a Y axis in an order of a stand-by position (lowering start position)→a lowered position→a take-out position→a pull-out position→an elevated position. Then, at the take-out position, the moving mechanism 5 sucks up and takes out, by the suction member 31, the molded product pushed out from a mold 12 of the molding machine 11 by ejection of an ejector pin driven by an ejector pin drive mechanism 13. Thereafter, the moving mechanism 5 moves the take-out head 8 attached with the suction member 31 from the elevated position to an open position (not shown). At the open position, suction by the suction member 31 is released, and the molded product MP is released at the open position.

The controller 7 performs operation control of the vacuum generator 33 and the pressure valve 34, and drive control of the moving mechanism 5. As shown in FIG. 1, in the present embodiment, the controller 7 includes at least a moving mechanism control section 71 that controls the moving mechanism 5, a vacuum generator control section 72 that controls the vacuum generator 33, and a suction error monitoring section 73 that monitors a suction error of the molded product by the suction member 31 based on output of the pressure detector 35. It goes without saying that the controller 7 may include other components if necessary to reduce air consumption.

The suction error monitoring section 73 includes a pressure data storing section 73A and a suction error cause determining section 73B. The pressure data storing section 73A stores a change in pressure output from the pressure detector 35 as time-series pressure data. The time-series pressure data include all information on suction situations in a process up to suction and a process after the suction. Therefore, even if the pressure does not rise or the pressure temporarily fluctuates for some reason during a process of the suction, these situations appear in the time-series pressure data. The time-series pressure data include, in a time series, a pressure in the pipe 32 before the suction member 31 sucks up the molded product (idle suction pressure), a suction start pressure Pb that indicates the suction member 31 has started sucking up the molded product, a post take-out pressure Pa that indicates a pressure after the suction member 31 together with the molded product has been elevated to a predetermined elevated position after the suction member 31 has sucked up the molded product, and a peak pressure Pp that is the maximum pressure out of pressures in the pipe 32 after the idle suction pressure has been detected and until the post take-out pressure Pa is detected. These pressures are characteristic pressures in the suction, but are not all clearly included in the time-series pressure data, and may or may not appear in the pressure data depending on the situation. Time-series reference data are created based on information (information on time-series pressure change patterns) such as presence or absence of these pressures, magnitudes of these pressures, and periods in which these pressures appear.

Here, the time-series reference data include one or more reference pressure values determined in advance by testing, and information on a plurality of time-series pressure change patterns collected in advance that are associated with causes of occurring suction errors and causes of likely suction errors. The time-series reference data used in the suction error cause determining section 73B include, for example, time-series reference data for determining that no suction error occurs in conditions that the post take-out pressure Pa and the peak pressure Pp are lower than a reference pressure value Pr, and determining that a suction error occurs or a suction error is likely to occur when the conditions are not satisfied. The suction error cause determining section 73B is configured to output information on a cause of a suction error occurring or to be likely to occur on a basis of a comparison result and the information on the plurality of time-series pressure change patterns when it is determined that the suction error occurs or the suction error is likely to occur. By using the time-series comparison result, a tendency that appears in the comparison result does not change greatly even if the take-out head being used is changed, and thus it is possible to prevent erroneous determination of the cause of the occurring suction error and the cause of the likely suction error.

Then, based on the time-series comparison result obtained by comparing the time-series pressure data stored in the pressure data storing section 73A with the predetermined reference data, the suction error cause determining section 73B determines and outputs occurrence of the suction error of the molded product by the suction member 31, the cause of the occurring suction error, the cause of the likely suction error, and solutions to deal with the causes. Specifically, the suction error cause determining section 73B used in the present embodiment includes a data storing section 73Ba that stores information such as the reference pressure value and the reference data, and a comparison section 73Bb and a search section 73Bc that are implemented by a processor.

The time-series reference data stored in the data storing section 73Ba in the suction error cause determining section 73B include reference data serving as a reference determined in advance based on a plurality of representative time-series change patterns 1 to 4 in which a suction error occurs or a suction error is likely to occur as shown in FIGS. 4B to 4E, a change tendency of pressure in these change patterns, time-series pressure data when the suction error actually occurred, or the like. In order to determine a cause and a solution therefor, the data storing section 73Ba includes the reference pressure value determined in advance by testing, and a cause of an occurring suction error and a cause of a likely suction error collected in advance, and information on solutions therefor.

In the suction error cause determining section 73B, the comparison section 73Bb compares the time-series pressure data stored in the pressure data storing section 73A with the time-series reference data. The comparison section 73Bb determines whether a suction error occurs and whether a suction error is likely to occur based on a comparison result. Then, based on the comparison result of the comparison section 73Bb, the search section 73Bc searches for and outputs a cause of the occurring suction error, a cause of the likely suction error, and solutions therefor. When the comparison section 73Bb of the suction error cause determining section 73B determines occurrence of the suction error or likelihood of the suction error, the result is output to the moving mechanism control section 71 as an alarm. The cause and the solution searched for by the search section 73Bc are displayed on a display device 75 in the controller 7. The display device 75 may display the cause and the solution using an image or may output the cause and the solution by voice.

For example, the reference pressure value Pr determined in advance by testing may be used as an example of the reference data used in the suction error cause determining section 73B as shown in FIGS. 4A to 4E. In this case, as a first stage of determination, the suction error cause determining section 73B determines that no suction error occurs in conditions that an idle suction pressure is lower than the reference pressure value Pr and the post take-out pressure Pa and the peak pressure Pp as will be described later are higher than the reference pressure value Pr, and determines that a suction error occurs when the conditions are not satisfied. By using a time-series comparison result in this way, it is possible to prevent erroneous determination that a suction error occurs due to an instantaneous pressure fluctuation even if the take-out head being used is changed. Here, the reference pressure value Pr is a pressure that is recognized as a pressure that is reached in many cases where no suction error occurs, based on past testing results. It has been known that the reference pressure value Pr varies depending on conditions such as a structure of the suction member 31, a length of the pipe 32, and a type of the vacuum generator 33. Therefore, the reference pressure value Pr is preferably changeable. A first reference pressure value used for determining an occurrence of a suction error and a second reference pressure value used for determining a likelihood of a suction error may be separately prepared as the reference pressure value Pr. In this case, the second reference pressure value is set to a value smaller than the first reference pressure value. It is preferable to adjust the reference pressure value Pr so as to decrease as the length of the pipe 32 increases.

In the present embodiment, for determination at a second stage, information such as the reference data is stored in the data storing section 73Ba of the suction error cause determining section 73B. As described above, the time-series reference data include the reference pressure value determined in advance by testing, and the information on the plurality of time-series pressure change patterns collected in advance that are associated with the causes of the occurring suction errors and the causes of the likely suction errors. The time-series reference data for comparison by the comparison section 73Bb includes, for example, time-series reference data for determining that no suction error occurs in conditions that the post take-out pressure Pa and the peak pressure Pp are lower than the reference pressure value Pr, and determining that the suction error occurs or the suction error is likely to occur when the conditions are not satisfied. The data storing section 73Ba includes a plurality of other time-series reference data for comparison. Based on the comparison result of the comparison section 73Bb, the search section 73Bc searches for the cause of the occurring suction error or the cause of the likely suction error, and the solution therefor, which are stored in the data storing section 73Ba in advance, and outputs the search result to the display device 75.

The pressure data storing section 73A stores time-series pressure data for each take-out cycle. Then, as described above, when the suction error cause determining section 73B determines the occurrence of the suction error or the likelihood of the suction error, the suction error cause determining section 73B determines the cause of the occurring suction error or the cause of the likely suction error based on the time-series change pattern, and outputs the solution therefor.

Figure 3:
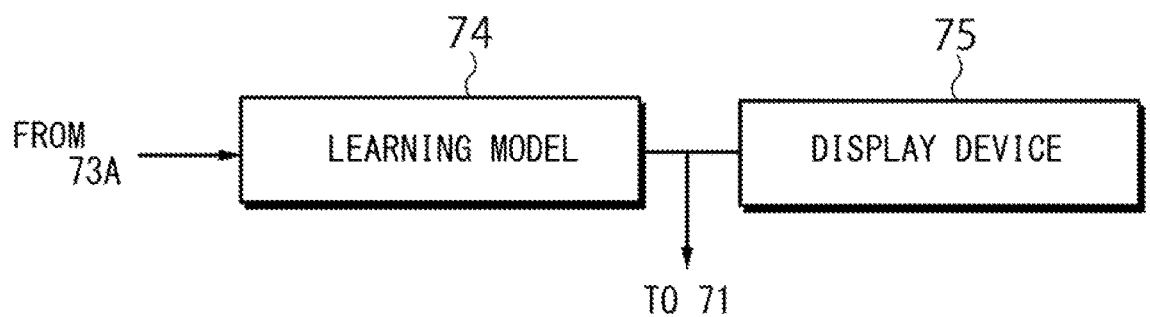
FIG. 3 is a diagram showing an example for implementing a part of a function of a suction error cause determining section using a learning model.

In order to further improve accuracy, as shown in FIG. 3, a learned learning model 74 constructed by machine learning may be used for the suction error cause determining section 73B. In this case, the suction error cause determining section 73B may acquire the cause of the occurring suction error or the cause of the likely suction error by inputting the time-series pressure data to the learning model 74 that has been subjected to machine learning using, as teacher data, a plurality of time-series pressure data collected in advance when suction errors occurred and causes of the occurring suction errors, time-series pressure data before suction errors occurred and causes of the likely suction errors, and solutions therefor. When such a learned learning model 74 is used, by inputting the time-series pressure data to the learning model 74, it is possible to acquire presence or absence of the occurrence of the suction error, presence or absence of the likely suction error, the causes of the occurring suction errors, and the solutions therefor. In this way, when the learning model 74 is used to determine the cause of the occurring suction error or the cause of the likely suction error, and the solution therefor based on the change pattern of the time-series pressure data, it is possible to determine the cause of the occurring suction error and the solution therefor with higher accuracy. The cause of the occurring suction error, the cause of the likely suction error, and the solutions therefor may be displayed on a screen of the display device 75, or may be output by voice from the display device 75. In this way, the operator can quickly deal with the cause.

Figure 4A:
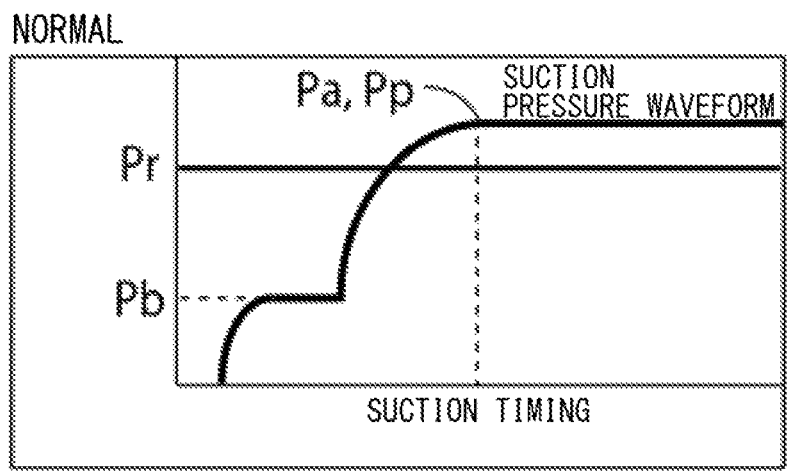
FIG. 4A is a typical time-series change pattern of a suction pressure when no suction error occurs.
Figure 4B:
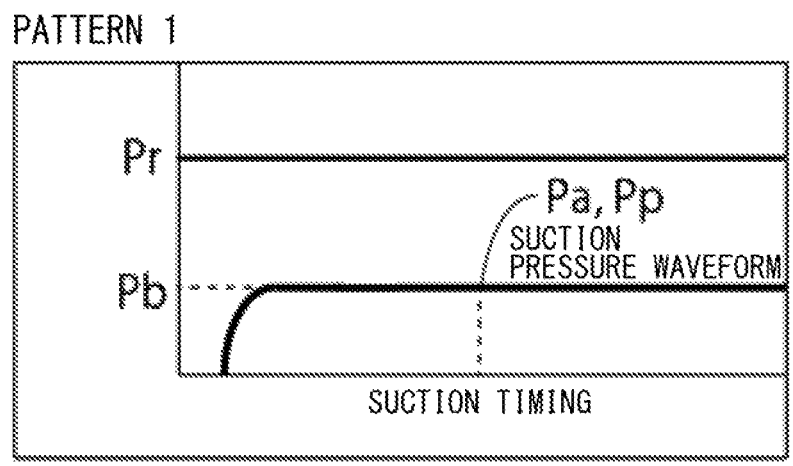
FIGS. 4B to 4E are examples of a time-series change pattern of the suction pressure when a suction error occurs or when a suction error is highly likely to occur.

FIG. 4A is a typical change pattern of time-series pressure data on a suction pressure when no suction error occurs. In contrast, FIGS. 4B to 4E are representative examples of a time-series change pattern of the suction pressure when a suction error occurs or when a suction error is highly likely to occur. In a case of the time-series change pattern 1 that is also used as reference data in FIG. 4B, a pressure in a suction pressure time-series waveform hardly changes even at a suction timing after reaching an idle suction pressure. In such a case, the suction member 31 may not be in contact with the molded product. When the comparison section 73Bb outputs to indicate that the time-series pressure data is input to the suction error cause determining section 73B as a comparison result, the search section 73Bc determines that a cause is an error in teaching or an attachment state of the suction member 31, and presents, as a solution, that it is necessary to perform teaching again or to inspect a state of the suction member 31.

Figure 4C:
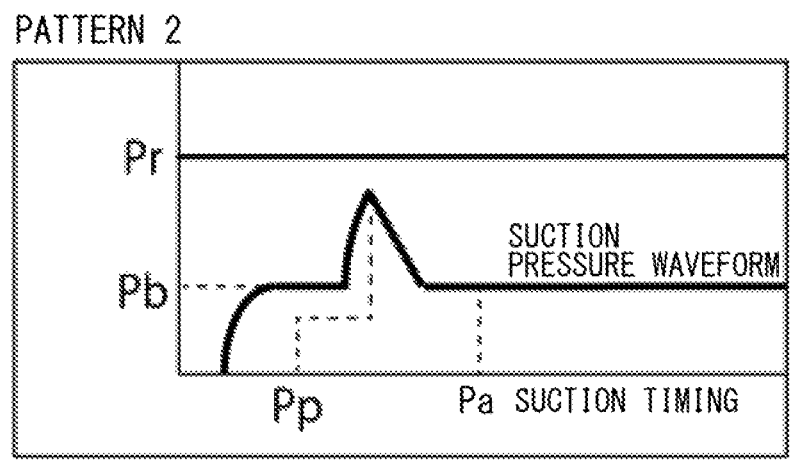

In a case of the time-series change pattern 2 serving as time-series reference data shown in FIG. 4C, a pressure in a suction pressure waveform rises once after reaching the idle suction pressure, but drops before the suction timing is reached. That is, the peak pressure Pp occurs before the post take-out pressure Pa is reached. When the input time-series pressure data corresponds to such reference data, the suction member 31 may be detached from the molded product after the peak pressure Pp occurs. Therefore, when the comparison section 73Bb outputs to indicate that the time-series pressure data is input to the suction error cause determining section 73B as a comparison result, the search section 73Bc determines that a cause is an error in teaching, a problem in the vacuum generator 33, or attachment of the suction member 31, and presents, as a solution, that it is necessary to perform teaching again, to inspect a setting condition of the vacuum generator 33, or to inspect the state of the suction member 31.

Figure 4D:
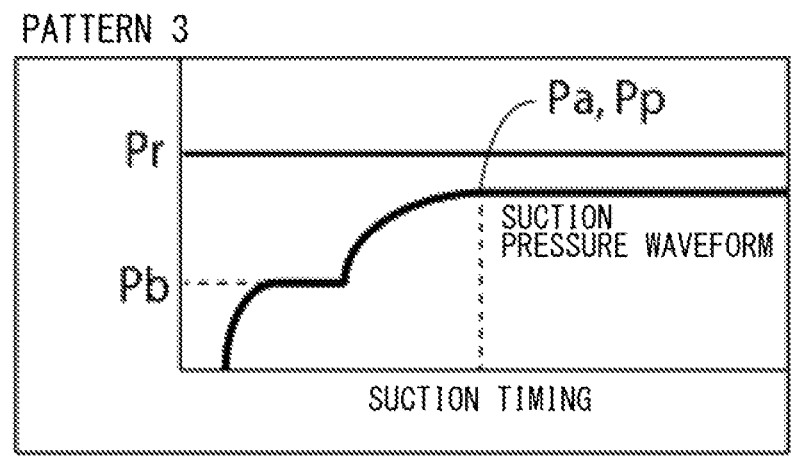

In a case of the time-series change pattern 3 serving as time-series reference data in FIG. 4D, a suction pressure waveform has a shape similar to that in a normal pattern in FIG. 4A as a result of a pressure rising after reaching the idle suction pressure. However, in this time-series change pattern, the pressure does not reach the reference pressure value Pr when the suction timing is reached. In such a case, a suction error may have occurred or a suction error is likely to occur in the near future. Therefore, when the comparison section 73Bb outputs to indicate that the time-series pressure data is input to the suction error cause determining section 73B as a comparison result, the search section 73Bc determines that a cause is an error in teaching, a problem in the vacuum generator 33, attachment of the suction member 31, or setting of the reference pressure value Pr, and presents, as a solution, that it is necessary to perform teaching again, to inspect the setting condition of the vacuum generator 33, to inspect the state of the suction member 31, or to confirm whether there is an error in the setting of the reference pressure value Pr.

Figure 4E:
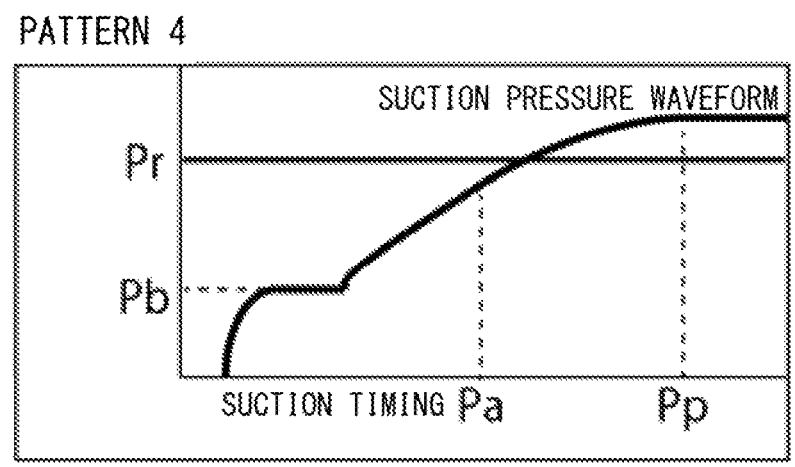

In a case of the time-series change pattern 4 serving as time-series reference data in FIG. 4E, a pressure in a suction pressure waveform is rising after reaching the idle suction pressure, and continues to rise even after the suction timing is reached. Then, the pressure does not reach the reference pressure value Pr when the suction timing is reached, and thereafter, the pressure exceeds the reference pressure value Pr and becomes saturated. In such a case, although the molded product is sucked up by the suction member 31, the molded product may not be sufficiently sucked up. That is, when such time-series pressure data is input to the suction error cause determining section 73B, the comparison section 73Bb determines that a suction error is likely to occur. Then, it is displayed on the display device 75 that setting of the suction timing is erroneous, and the search section 73Bc presents re-teaching as a solution. At this time, it is also effective to present, as a solution, that it is necessary to confirm the vacuum generator 33 or the suction member 31.

FIG. 5 summarizes examples of events, causes, and confirmation items as solutions therefor in cases of the time-series change patterns 1 to 4, serving as the time-series reference data in FIGS. 4B to 4E. In the learning model 74 in FIG. 3, these data are also constructed as the teacher data.

In the present embodiment, the suction error cause determining section 73B displays the cause and the solution on the display screen of the display device or notifies the operator of the cause and the solution by voice on a basis of a determination result. Therefore, it is possible to obtain an advantage that the operator can easily take measures after the suction error is found.

For example, in order to further improve the accuracy, as shown in FIG. 3, the learned learning model 74 constructed by machine learning may be used for the suction error cause determining section 73B. In this case, the suction error cause determining section 73B may acquire the cause of the occurring suction error by inputting the time-series pressure data to the learning model 74 that has been subjected to machine learning using, as teacher data, a plurality of time-series pressure data collected in advance when suction errors occurred and causes of the occurring suction errors, and a plurality of time-series pressure data collected in advance when suction errors were likely to occur and causes thereof. In this case, by using, as the learning model 74, the learning model 74 that has been subjected to machine learning using, as teacher data, the plurality of time-series pressure data collected in advance when the suction errors occurred, the causes of the occurring suction errors, and the solutions therefor, it is possible to acquire presence or absence of occurrence of a suction error, presence or absence of likelihood of a suction error, causes thereof, and solutions therefor by inputting the time-series pressure data to the learning model 74. In this way, when the learning model 74 is used to determine the cause of the occurring suction error or the cause of the likely suction error, and the solution therefor based on a change pattern of the time-series pressure data, it is possible to determine the cause of the occurring suction error and the solution therefor with higher accuracy. The cause of the occurring suction error, the cause of the likely suction error, and the solutions may be displayed on the screen of the display device 75, or may be output by voice from the display device 75. In this way, the operator can quickly deal with the cause.

The time-series reference data, and data on the causes of the occurring suction errors and the solutions shown in FIGS. 4A to 4E and 5 are part of the teacher data when the learning model 74 shown in FIG. 3 is created, but in creating an actual learning model, data when multiple types of take-out heads were used and data when multiple types of suction members were used are collected as much as possible and used as the teacher data.

According to the invention, based on a time-series comparison result obtained by comparing time-series pressure data with predetermined time-series reference data, even when the time-series pressure data temporarily exceeds a threshold, it is possible to prevent erroneous determination that no suction error occurs. Moreover, it is possible to detect that some cause causing a suction error during an operation process has occurred based on a time-series change pattern of the pressure data. If a feature of a change in the pressure appearing in the time-series pressure data when the suction error occurs due to a previously known cause is grasped, it is also possible to determine a cause of the suction error or likelihood of the suction error. Therefore, according to the invention, it is possible to determine occurrence of the suction error and/or likelihood of the suction error of the molded product with higher accuracy than in the related art, and to know the cause of the occurrence.

What is claimed is:

1. An apparatus for taking out a molded product, comprising:
    a vacuum suction device including a suction member operable to suck up a molded product, a vacuum generator connected to the suction member via a pipe to apply a vacuum pressure to the suction member, a pressure valve operable to control the vacuum pressure to be applied from the vacuum generator to the suction member, and a pressure detector operable to detect a pressure to be applied to the suction member;
    a moving mechanism operable to move the suction member to take out the molded product from a mold of a molding machine;
    a controller operable to perform operation control of the vacuum generator and the pressure valve, and drive control of the moving mechanism;
    a pressure data storing section operable to store a change in the pressure detected by the pressure detector as time-series pressure data; and
    a suction error cause determining section operable to determine if a suction error by the suction member occurs and/or a suction error is likely to occur, and a cause thereof, wherein:
    the suction error cause determining section determines if a suction error by the suction member occurs and/or a suction error is likely to occur, and a cause thereof on a basis of a result of comparing the time-series pressure data with predetermined time-series reference data;
    wherein the time-series pressure data includes an idle suction pressure in the pipe before the suction member sucks up the molded product, a suction start pressure that indicates the suction member has started sucking up the molded product, a post take-out pressure that indicates a pressure after the suction member together with the molded product has been elevated to a predetermined position after the suction member has sucked up the molded product, and a peak pressure that is a maximum pressure out of pressures in the pipe after the idle suction pressure has been detected and until the post take-out pressure is detected; and
    wherein the time series reference data include one or more reference pressure values determined in advance by testing, and information on a plurality of time-series pressure change patterns collected in advance that are associated with causes of suction errors; and, the suction error cause determining section determines that no suction error occurs in conditions that the idle pressure is lower than the reference pressure value and the post take-out pressure and the peak pressure are lower than the reference pressure; determines that the suction error occurs or the suction error is likely to occur when the conditions are not satisfied; and outputs information on causes of suction errors occurring or likely to occur on a basis of the result of comparing and the plurality of time-series pressure change patterns when it determines that the suction error occurs or the suction error is likely to occur.

2. The apparatus for taking out a molded product according to claim 1, wherein the reference pressure value is changeable.

3. The apparatus for taking out a molded product according to claim 2, wherein the reference pressure value includes a first reference pressure value used for determining an occurrence of the suction error and a second reference pressure value used for determining a likelihood of the suction error.

4. The apparatus for taking out a molded product according to claim 1, wherein:

the pressure data storing section stores the pressure data for each take-out cycle; and the suction error cause determining section outputs a solution to deal with the cause of the suction error when it is determined that the suction error occurs or the suction error is likely to occur.

5. The apparatus for taking out a molded product according to claim 2, wherein:

the pressure data storing section stores the pressure data for each take-out cycle; and the suction error cause determining section outputs a solution to deal with the cause of the suction error when it is determined that the suction error occurs or the suction error is likely to occur.

6. The apparatus for taking out a molded product according to claim 3, wherein:

the pressure data storing section stores the pressure data for each take-out cycle; and the suction error cause determining section outputs a solution to deal with the cause of the suction error when it is determined that the suction error occurs or the suction error is likely to occur.

7. The apparatus for taking out a molded product according to claim 2, wherein:

the suction error cause determining section acquires an occurrence of the suction error or a likelihood of the suction error and the respective causes thereof from a learning model by inputting the time-series pressure data into the learning model that has been subjected to machine learning using, as teacher data, a plurality of time-series pressure data collected in advance when a suction error occurs or is likely to occur, and the causes of suction errors.

8. The apparatus for taking out a molded product according to claim 2, wherein:

the suction error cause determining section acquires a cause of the suction error and a solution to deal with the cause of the suction error from a learning model by inputting the time-series pressure data into the learning model that has been subjected to machine learning using, as teacher data, a plurality of time-series pressure data collected in advance when a suction error occurred or it is determined that a suction error was likely to occur, and the causes of occurring suction errors, the causes of likely suction errors, and the solution therefor.

9. The apparatus for taking out a molded product according to claim 4, wherein the causes of occurring suction errors and causes of likely suction errors and the solution therefor are displayed on a screen of a display device.

10. The apparatus for taking out a molded product according to claim 4, wherein the causes of occurring suction errors and causes of likely suction errors and the solution therefor are output by voice from a display device.

* * * * *